March 21, 1939.  W. E. BOSTWICK  2,151,460
ALTERNATING CURRENT MOTOR
Filed Sept. 30, 1938  3 Sheets-Sheet 1
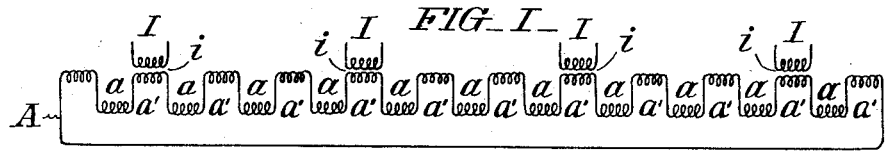
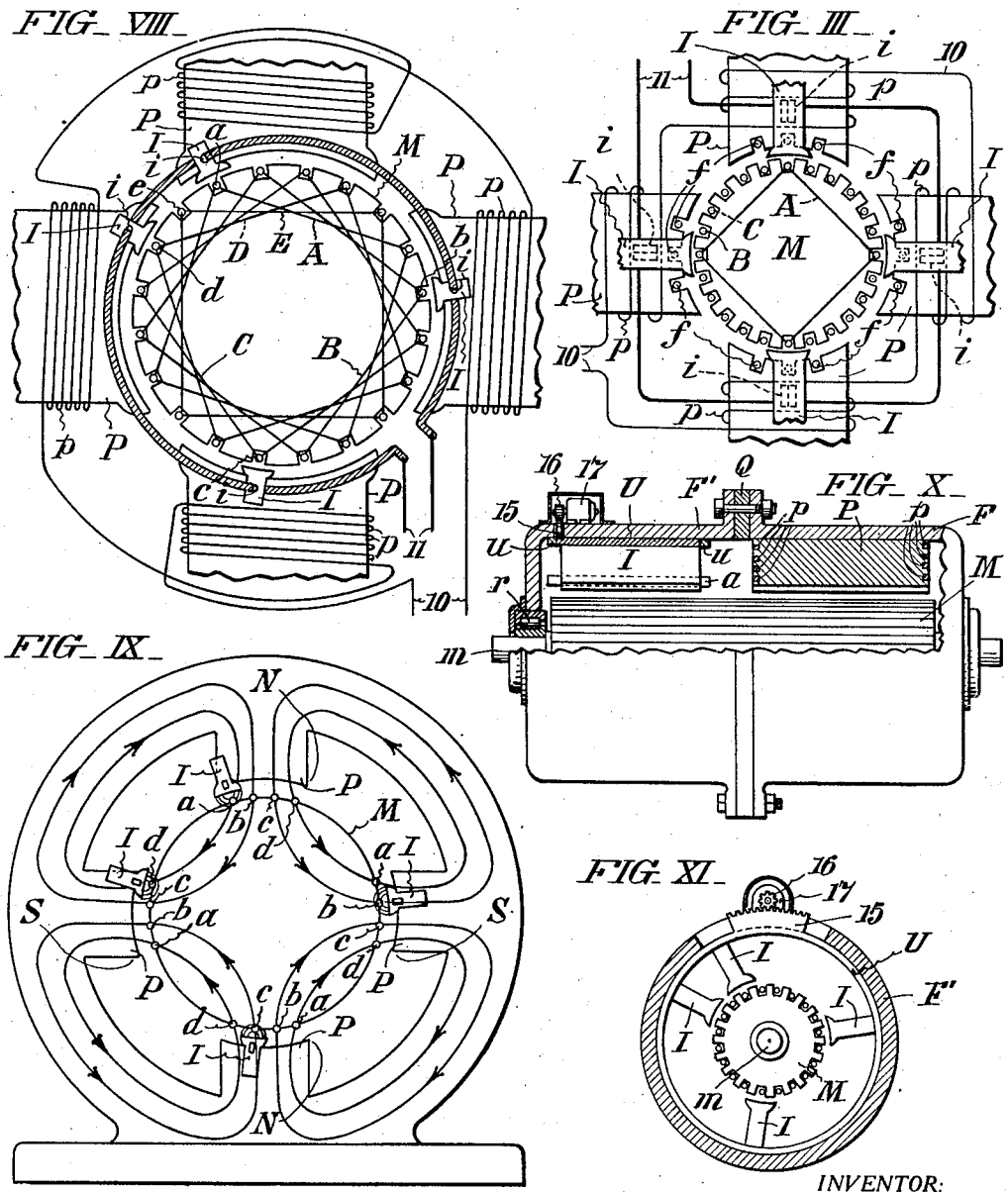
INVENTOR:
William E. Bostwick,
BY Paul & Paul
ATTORNEYS.

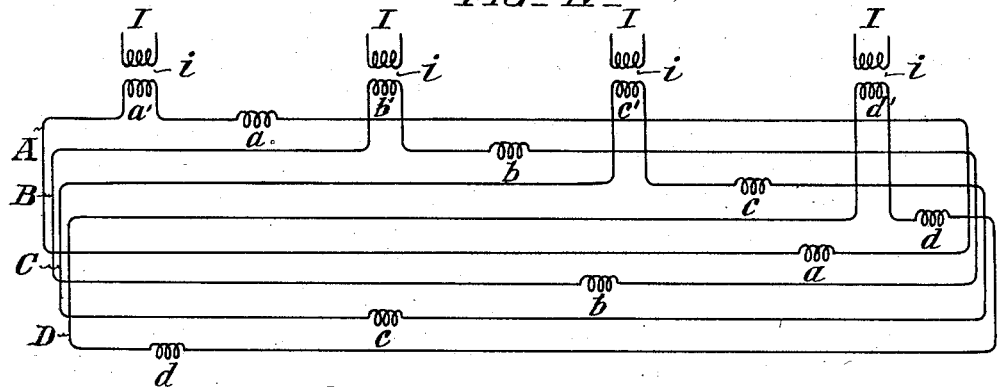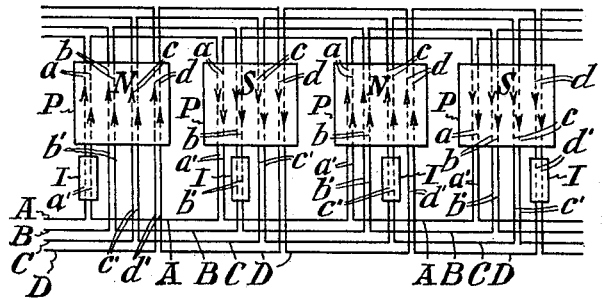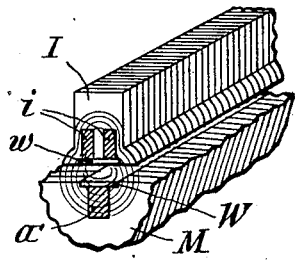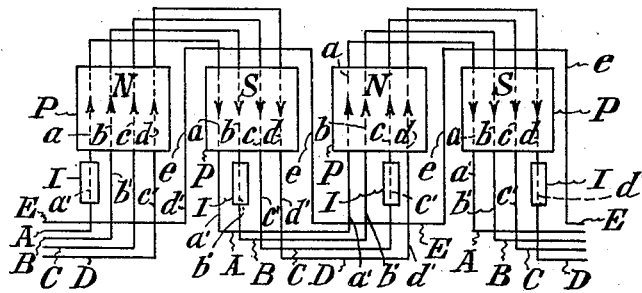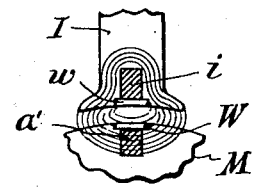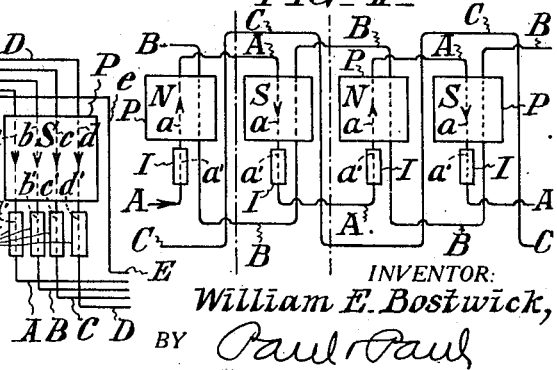
INVENTOR:
William E. Bostwick,
BY Paul & Paul
ATTORNEYS.

March 21, 1939.  W. E. BOSTWICK  2,151,460
ALTERNATING CURRENT MOTOR
Filed Sept. 30, 1938    3 Sheets-Sheet 3
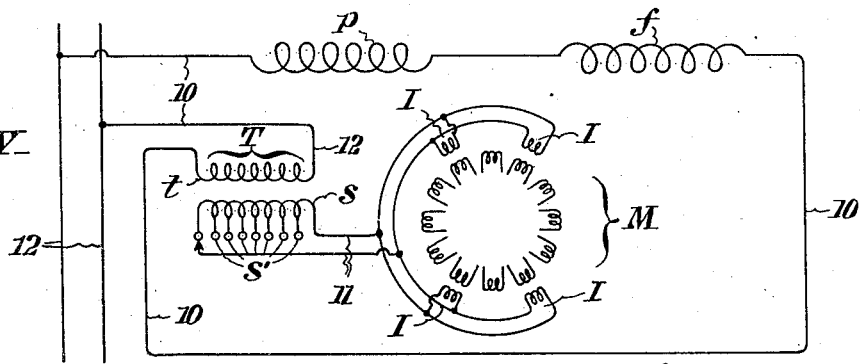
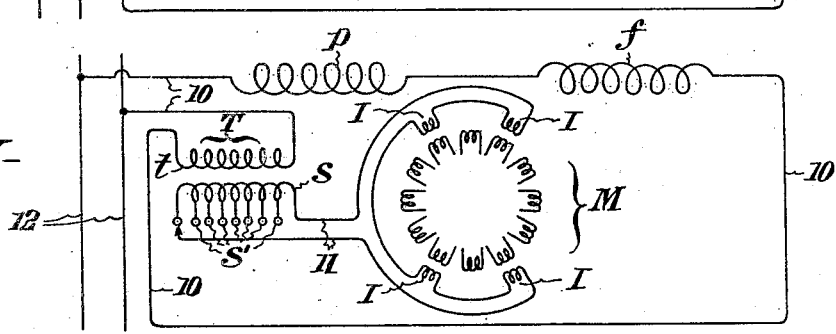
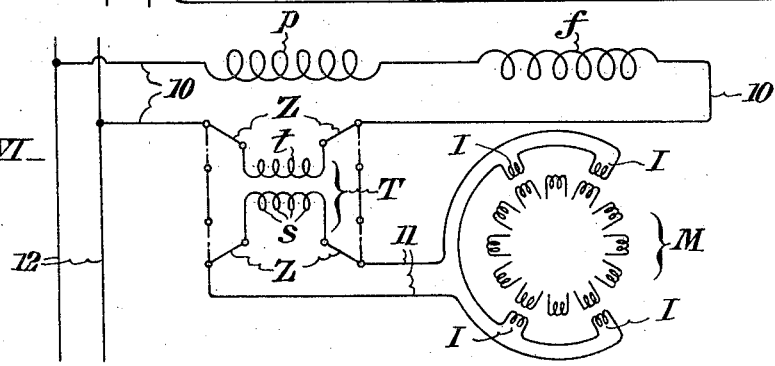
WITNESSES:
Hubert Fuchs
George L. Cowley
INVENTOR:
William E. Bostwick,
BY Paul & Paul
ATTORNEYS.

Patented Mar. 21, 1939

2,151,460

UNITED STATES PATENT OFFICE 2,151,460

ALTERNATING CURRENT MOTOR

William E. Bostwick, Philadelphia, Pa.

Application September 30, 1938, Serial No. 232,491

11 Claims. (Cl. 172—278)

This invention relates to alternating current motors, and to a new motor that can be made to afford various advantages. In particular, single phase motors suitable for railway motive power can be built without commutators while retaining series motor characteristics, and can be made compact and comparatively inexpensive, free from the speed limitations imposed on present A. C. railway motors by the commutator, and without limitation to the low applied voltage that is necessary for good commutation. Various other features and advantages of the invention will appear from the following description of species thereof, and from the drawings. So far as novel over the art, all the features herein illustrated or described are of my invention.

This application is a continuation-in-part of my application Serial No. 705,095, filed January 3, 1934, as to common subject-matter disclosed and claimed.

In the drawings, Fig. I is a diagram of a schematic arrangement of armature conductors and associated inductors illustrating the principle of my new type of motor, the main field poles being omitted; Fig. II is a diagrammatic partial development of corresponding armature conductor and inductor arrangements for a four-pole motor; and Fig. III is a diagrammatic end view of an arrangement corresponding to Figs. I and II, showing an armature with portions of its windings, main field windings, and inductors with their "windings" or conductors, besides electrical connections for the field and inductor windings, and, incidentally, portions of a compensating winding.

Fig. IV is another diagram of a schematic arrangement of armature conductors and associated inductors for my motor, the main field poles being omitted; Fig. V is a diagrammatic partial development of corresponding armature windings for a four-pole motor, with one arrangement of inductors; and Fig. VI is a similar diagram with another inductor arrangement.

Fig. VII is a diagrammatic partial development of another armature conductor and inductor arrangement for a four-pole motor, showing two conductors per armature slot, insulated from each other, and also showing the main field poles.

Fig. VIII is a diagrammatic end view of a motor corresponding to Figs. I, IV, and V, illustrating the electrical connections of the armature windings, the main field pole windings, and the inductor conductors for inducing current in the armature windings; and Fig. IX is a diagrammatic view of the same motor, omitting the windings and electrical connections, but including the inductors, the stator frame for the main poles, and flux diagrams of the main field flux and of the inductor flux.

Fig. X is a diagrammatic partial axial section through a motor corresponding to Figs. IV, V, and X, illustrating the spatial relations of main poles, inductors, and armature, and including arrangements for shifting the inductors angularly or circumferentially relative to the main poles; and Fig. XI is an end view of the motor shown in Fig. X, further illustrating the provisions for shifting the inductors, the motor casing being shown in cross section.

Fig. XII is a fragmentary end view of an inductor and an armature, showing in section the inductor conductor and a passing armature conductor, and also including a magnetic flux diagram for the inductor; and Fig. XIII is a similar fragmentary perspective and sectional end view illustrating an inductor with double conductors.

Fig. XIV is a wiring diagram of electrical connections for my motor, including a phase reversing transformer.

Fig. XV is a diagram similar to Fig. XIV, showing somewhat different connections.

Fig. XVI is a wiring diagram generally similar to Fig. XV, illustrating variation of the wiring connections from starting to a running condition—not necessarily the normal running condition.

Fig. XVII is a diagram similar to Fig. XVI illustrating another variation.

The single phase series A. C. motor now in use for railway motive power has a rotating armature and commutator, three fields, and one set of brushes for each main field pole. The distributed main series field is a torque field, which in conjunction with the armature current produces the torque. The distributed compensating field neutralizes armature reactance. The interpole field—in combination with a resistor shunted around it—compensates for the "transformer" voltage induced in the short-circuited armature coils during commutation. The armature winding consists of a number of coils wound continuously around the armature core, and connected at regular intervals to the commutator bars. The commutator and brush system serves as a means of getting current into the rotating armature in such phase relation and of such value as to produce torque and rotation. As the torque is dependent on the number of commutator bars and on the number of sets of brushes, the commutator has to be relatively large, and commutator and brush maintenance are large factors in the general maintenance costs. The commutator construction is such as to limit speed, and the applied voltage must be kept relatively low, because of the inherent electrical characteristics of the motor.

Some single phase motors of the induction type now in common use have what is sometimes called a split field, including a combination of inductances, resistances, and (sometimes) capacities with two fields, about 90° out of phase with one another, in such wise as to produce a displacement of their flux. The operation of such motors is explained on the principle of the "rotating field," so to term it, produced by the magnetic inter-reaction of the two fields. They have no commutators or brushes. An outstanding characteristic of such motors is constant speed.

My new motor is in effect an induction motor, of series characteristics, having the usual main torque-producing field, and provided with inductor(s) for inducing current in the armature, but without the usual brush and commutator system. Unlike the two fields of the single phase induction motor above referred to, however, my main and inductor fields are preferably isolated magnetically from one another, substantially (i. e., as far as possible), and are preferably displaced about 180° out of phase with one another. The object of the inductor(s) is to produce in the armature a current in such phase relation to the main torque field flux as to produce torque and rotation by reaction with the torque field. In other words, my motor is a single phase motor with inductor(s) substituted for the usual commutator and brushes as a means of putting the desired current through the armature. To bring the inductor-induced armature currents more in phase with the main field flux, the inductor(s) or the main fields (or both) may be shunted with reactors or resistances—either singly, or in series, or in parallel, or in series-parallel combinations. The motor may also have a compensating field—which may in a sense be regarded as an auxiliary field—only indirectly affecting the main torque and inductor fields.

In carrying out my invention, the armature may have various types of winding(s) with active portions arranged in suitable succession. Whatever the type and character of the armature winding(s), a series of inductors are provided, so arranged and connected to the source of current supply that as portions of the rotating armature conductors pass successively through the inductor fields, the latter will induce in the rotating armature conductors a voltage which will cause a torque-producing current to flow in them. The polarity of the inductors determines the direction of this induced current, and its relation to the main field determines the direction of armature rotation. The inductors may be connected either in parallel or in series with one another, although they need not necessarily be of like simultaneous polarity. The air gaps in the magnetic circuits should preferably be as small as possible, which may be accomplished by the use of roller bearings for the armature shaft. The stator frame of the motor may be provided with main and compensating fields substantially as now used, to serve the same purposes as those now employed. While I have illustrated and explained my invention with particular reference to a four-pole motor, it will be understood that it is equally applicable to motors with a greater or less (even) number of poles.

Fig. I shows schematically an arrangement of armature conductors and associated inductors for a continuous winding A progressive around the armature and closing on itself at the starting point. Here the armature conductors $a$ (portions of the armature winding A) which coact with the main field to produce rotation are serially connected through conductors $a'$ (also portions of the winding A) which lie in inductive proximity to conductors or windings $i$ of inductors I such as already referred to. The various spirals of the armature winding A in Fig. I represent the transfer of energy by induction, rather than actual spiral windings. Fig. II shows a partial development of such an arrangement for a four-pole machine, with instantaneous polarities and directions of current flow. Besides the inductors I and the armature windings A, similar armature windings B and C are shown, as well as the poles P; but the main field windings for the poles P are not shown, to avoid confusion. In Fig. II, the different axial positions or spacial separation of the poles P and inductors I, and of the portions $a$ and $a'$ of the winding A which they affect, correspond to and represent the magnetic isolation of the main and inductor fields from one another, as already referred to, so that the conductor portions $a'$ do not traverse the torque field of the poles P. Fig. III affords an end view of a machine corresponding to Figs. I and II, with the main pole windings $p$ connected in series in a circuit 10, and with inductors I arranged in line with the pole pieces P as in Fig. II, and having their conductors or "windings" $i$ connected in series in a circuit 11, and with a plurality of windings A, B, C, etc., progressive around the armature M. Details of construction, of spatial and mechanical arrangement, and of electrical connections suitable for the inductors I and the associated motor parts are shown and described hereinafter. With only a single inductor I for each pole P, all arranged in identical positions relative to the corresponding poles, as in Figs. II and III, just one winding at a time (as shown, the winding A) is affected by the four inductors I; but this winding is affected simultaneously by all four of these inductors. Fig. III also shows portions of a compensating winding $f$, arranged as usual in slots in the faces of the poles P; but this is omitted from most other figures of the drawings to avoid confusion, since it forms no part of my invention.

Figs. IV, V, and VI illustrate schematically and in development an arrangement of armature windings A, B, C, D, progressive around the armature (and around the field pole and coil assembly), and each closing on itself at the starting point, together with inductors I arranged in positions to affect simultaneously all the armature windings opposite the poles P at a given instant. As shown, the armature conductors $a$, $b$, $c$, and $d$ (portions of the armature windings A, B, C, and D) which coact with the main fields to produce rotation are serially interconnected through conductors $a'$, $b'$, $c'$, $d'$ (also portions of the windings A, B, C, and D) which lie in inductive proximity to conductors $i$ of inductors I such as already referred to. In Fig. IV, the various spirals are intended to suggest the transfer of energy by induction, rather than to represent actual spiral winding of the conductors. Besides the inductors I and the armature windings A, B, C, and D, four main field poles P are also shown in Figs. V and VI, though the main field windings for these poles P are omitted, to avoid confusion. Various inductor arrangements may be used: e. g., there may be one inductor I per pole P, spaced as shown in Fig. V; or there might be one inductor I per armature winding for each pole P, as shown in Fig. VI. Instantaneous polarities and directions of current flow are shown in Figs. V and VI, and also a winding E which is at the moment inactive, because of the positions of its portions $e$ between the poles P.

Fig. VII illustrates armature windings A, B, C, D not progressive around the armature as in Figs. I-VI, but consisting of a series of short-circuited coils A, B, C, D, each closed directly on itself and of such pitch that when one side $a$ of a coil A is under the influence of a main field pole P of one polarity (north or south), the other side $a$ of such coil is under the influence of a pole P of the opposite polarity (south or north). In Fig. VII, instantaneous polarities and directions of current flow are shown. The positions of the inductors I in Fig. VII correspond to those shown in Fig. V.

In Figs. II, V, VI, and VII, the inductors I are shown in front of the main poles P, though these relations need not necessarily obtain. In Figs. II, V, VI, and VII, the different axial positions or spacial separation of the poles P and inductors I, and of those portions $a$ and $a'$, $b$ and $b'$, $c$ and $c'$, $d$ and $d'$, of the windings A, B, C, D with which the main field and the inductors I interact, correspond to and represent magnetic isolation of the main and inductor fields from one another, as already referred to, so that the conductor portions $a'$, $b'$, $c'$, $d'$ do not traverse the torque field of the main poles P.

Fig. VIII is an end view of a motor such as represented in Figs. IV and V, having four main field poles P with their windings $p$ serially connected in a circuit 10. The armature M is shown with portions $a$, $b$, $c$, $d$ of four of its windings A, B, C, D in active positions opposite the poles P, and with portions $e$ of another winding E in inactive positions between the poles P. Four inductors I (with their conductors $i$) are also shown, so placed relative to the poles P that each of them may coact with one of the windings A, B, C, D to induce current therein, while its portion $a$, $b$, $c$, or $d$ is opposite one of the poles P, as shown. The inductor conductors or "windings" $i$ are shown serially interconnected in a circuit 11. From comparison of Figs. III, V, and VIII with Fig. VI, it will readily be understood how with four inductors I per pole P, arranged as illustrated in Fig. VI, each winding A, B, C, D would be affected by four inductors I concurrently. Fig. IX shows the four main field poles P mounted on the main stator frame or motor casing F, as well as the armature M with the active portions $a$, $b$, $c$, $d$ (only) of its windings, and the inductors I, but Fig. IX omits the electrical connections, as well as the main pole windings. The flux lines in Fig. IX represent the main field flux due to the interaction of the pole P, and the flux for the inductors I.

Figs. X and XI illustrate an arrangement and a mechanical construction for mounting the inductors I in or on the stator frame or motor casing F in suitable relations to the poles P and to the portions $a'$, $b'$, $c'$, $d'$ of the armature windings A, B, C, D (Figs. IV-VIII), and in proper isolation, magnetically, from the main torque field due to the poles P, with provisions for shifting the inductors I angularly relative to the poles P upon occasion. This is suitable for any of the motors illustrated in Figs. I-IX. As shown in Fig. X, the main pole pieces P and the inductors I are mounted in a (conventional) motor casing F which also has roller bearings $r$ for the shaft $m$ of the armature M. As one means of assuring sufficient magnetic isolation of the inductors I from the pole pieces P, said parts I and P are shown spaced apart in the axial direction, and the casing F is shown as made in flanged halves para-magnetically bolted together on an interposed para-magnetic flat spacing ring Q, bronze being of course one suitable material for the bolts and the ring Q. Even better magnetic isolation of the inductors I from the pole pieces P and the main torque field can be obtained by making of para-magnetic material (bronze) the whole (left-hand) portion F' of the casing F, that carries the inductors I.

It will, of course, be understood that the angular interrelations of inductors I and pole pieces P may in practice be varied from that shown in Figs. VIII and IX, especially during starting of the motor. For example, if the motor should happen to stop with none of the armature conductor portions $a'$, $b'$, $c'$, $d'$, etc., in suitable inductive position relative to any of the inductors, it would be desirable to shift the inductors I into positions substantially opposite such armature conductor portions, to permit of restarting the motor. For this purpose, the inductors I may be mounted (in the relative angular positions shown in Fig. VIII) on a paramagnetic (bronze) ring U arranged to turn in the left-hand half of the casing F, between annular stop rings $u$ detachably secured therein. For shifting the ring U and inductors I, a rack and pinion arrangement may be provided, consisting of an arcuate rack 15 on the ring U exposed through an opening in the motor casing portion F' and engaged with a toothed pinion 16 on the shaft of a small reversible (electric) motor 17, mounted on the casing portion F'. The operation of the motor 17 and the shifting of the ring U and inductors I may be controlled automatically or manually, as desired.

Figs. XII and XIII illustrate interrelations of inductor conductors $i$ and armature conductor portions $a'$, $b'$, $c'$, $d'$ such that the inductors I may induce voltages and currents in the armature windings A, B, C, D as the portions $a'$, $b'$, $c'$, $d'$ pass through the inductor fields. These relations are applicable to any of the forms of motor illustrated in Figs. I-XI. Here the armature conductors $a'$ are shown in the slots of the laminated iron armature core M, where they are held in place by the slot wedges W, as usual in armature construction, and the inductor conductors $i$ are shown in slots in the laminated iron structure of the inductor I (which may be carried from the stator frame of the motor), where they are held in place by slot wedges $w$. As shown in Fig. XII, the "winding" of each inductor I comprises a single conductor $i$; while in Fig. XIII it is double, comprising a pair of conductors $i$, $i$ extending parallel to one another and connected in the supply circuit in parallel, so that the current flow in them is in the same direction. As the armature conductors $a'$ pass the inductors I, they are (substantially) parallel with the inductor conductors $i$.

It will be seen, therefore, that these inductors I of Figs. XII and XIII and their action differ essentially from the main field poles P. First, while the main torque field results (as in the ordinary motor) from the interaction of the poles P, each inductor I produces its own individual field (around its conductor(s) $i$) more or less independently of other inductors I. Secondly, while the lines of force of the individual inductor fields cut the armature winding conductor portions a', b', c', d' as said portions a', b', c', d' pass the inductors I substantially parallel with the inductor conductors i, so that the inductor conductors i act substantially as current transformer primaries to induce current in the armature windings as transformer secondaries, the rotational inductive effects in the conductors a', b', c', d' as they enter and leave each of these inductor fields tend to counteract or neutralize each other, which is not, however, the case with respect to the fields of the poles P.

Figs. II, III, V-IX, XII and XIII show the inductors I and their conductors or windings i as of very limited circumferential spread, so that each covers substantially but a single armature slot with its conductor a', b', c', or d'. Thus each inductor I with its winding i coacts as a current transformer primary with the individual armature conductors a', b', c', d' successively as transformer secondaries. In contrast with the limited circumferential spread of the inductors I and windings i is the considerable spread of the main torque field poles P and their windings p, shown as covering several armature slots and their conductors a. This difference in spread corresponds with the difference in function (as described above) between the main torque field means and the inductors.

For the development of torque, the armature current must be substantially in phase with the field flux and current. In the present A. C. motor using a commutator and brushes, the armature and field currents are substantially in phase, because the armature and field windings are in series, and thus the field flux is very nearly in phase with the field current, so that such motors are self-starting. Certain single phase induction motors that use the conventional type of winding are not self-starting, because the current in the armature is too far out of phase with the field flux. However, my motor having separate inductors of substantially current transformer characteristics (with their fields isolated as far as possible from the fields of the main poles) is self-starting, when connected, substantially as shown in Fig. XIV, with a phase-reversing transformer or the like for causing the direction of the armature current to approach an in-phase relation to the field flux before the armature begins to turn. As shown in Fig. XIV, the main field p and the compensating field f are serially connected in a circuit 10, and the inductors I are connected in series in a circuit 11 which includes the secondary s of a phase-reversing transformer T whose primary t is connected in series with circuit 10 across the A. C. current supply line or source of energization 12. The transformer secondary s may be provided with taps at s' by means of which the inductor current can be varied and controlled. The currents induced by the inductors I in the windings A, B, C, D (owing to the proximity of their portions a', b', c', d' to the inductors) cause the usual reactions with the fields p, f, and produce torque and rotation of the armature. Fig. XV is like Fig. XIV except that it shows the inductors I connected in parallel across their circuit 11, instead of in series in it.

The starting conditions described above obtain only at the instant of starting, before the armature begins to turn, when transformer relations exist in three instances: viz., in the phase reversing transformer T, in the inductors I and the armature M regarded as together constituting a transformer, and in the torque field p and the armature M similarly regarded. As soon as the armature M begins to rotate, voltages are generated in its windings in consequence of the combined influence of rotation and induction affecting the main field-armature combination; but the inductor-armature combination still produces only inductive effects in the armature windings. The rate of rotation of the armature M will be such as to give balanced voltage conditions.

For running, the starting connections which include the transformer T shown in Figs. XIV and XV may be varied by changing to direct connections, cutting out the transformer T. As shown in Fig. XVI, this may be done by shifting switches Z from their full-line positions to the dotted line positions shown. Thus in running under these conditions, the inductors I are directly in series with the serially connected main and compensating fields p, f, instead of, as in starting, being supplied from the secondary s of the transformer T, whose primary t is then in series with the fields p, f. To obviate undue suddenness of such a transition, a variable reactor R may be provided, with connections as shown in Fig. XVII, such that by a first movement of the switch Z the reactor R will be interposed in the connection to the inductors I, and thereafter cut out, or in, or both in and out by subsequent (further) movements of said switch, and of the other switches Z. Thus the transition is rendered less abrupt than in Fig. XVI.

Having thus described my invention, I claim:

1. The combination with an alternating current motor, of series characteristics, consisting essentially of means affording a main torque field, inductor means affording a field magnetically isolated, substantially, from said main field, and an armature with its winding in both of said fields, of a transformer interposed in the current supply connection to said inductor means for displacing its field for starting the motor, and means for cutting out said transformer and connecting said inductor means directly to the current supply in series with the main field means after starting.

2. The combination with an alternating current motor, of series characteristics, consisting essentially of means affording a main torque field, inductor means affording a field magnetically isolated, substantially, from said main field, and an armature with its winding in both of said fields, of a transformer interposed in the current supply connection to said inductor means for displacing its field for starting the motor, means for cutting out said transformer and connecting said inductor means directly to the current supply in series with the main field means after starting, and means for rendering the transition thus effected less abrupt.

3. An alternating current motor consisting essentially of main torque field means comprising windings arranged with substantial circumferential spread; an armature with winding for torque-producing reaction with the main torque field; and inductors with windings of very much less circumferential spread than the main field windings coacting as transformer primaries with the armature winding as transformer secondary, and in such phase relation with the main torque field means that current induced in the armature winding by said inductors is substantially in phase with the field flux of the main torque field.

4. An alternating current motor consisting essentially of main torque field poles each comprising windings arranged with circumferential spread to cover several armature slots at a time; an armature with winding in its slots for torque-producing reaction with the main torque field; and inductors with windings each covering substantially but a single armature slot at a time and coacting as transformer primaries with the armature winding as transformer secondary, and in such phase relation with the main torque field means that current induced in the armature winding by said inductors is substantially in phase with the field flux of the main torque field.

5. An alternating current motor consisting essentially of main torque field means; an armature with winding for torque-producing reaction with the main torque field; inductor means coacting as transformer primary with the armature winding as transformer secondary, and in normal running of the motor substantially in phase with the main torque field means; means interposed in the current supply connections to one of them for displacing said main torque field means and inductor means out of phase with one another for starting the motor; means for cutting out said phase-displacing means and substituting a direct connection after starting, thus bringing said inductor means and said main torque field means substantially in phase with one another; and means for rendering less abrupt the transition thus effected.

6. An alternating current motor comprising torque field means including a series of poles wound to interact in producing a torque field of magnetic flux, and energized from an alternating current source; an armature having portions of its winding conductors arranged for torque-producing reaction with said torque field, and having other portions of its said conductors spacially removed, so that during the running of the motor these latter portions of the armature conductors do not traverse said torque field; and inductors comprising primaries also energized from the alternating current source and spacially removed from said torque field, but arranged to extend substantially parallel with and in inductive proximity to the aforesaid other portions of the armature conductors, as they pass; all so that the independent fields of magnetic force around the inductor primaries induce currents in the armature windings for concurrent reaction with the main torque field to produce torque.

7. An alternating current motor comprising torque field means including a series of poles wound to interact in producing a torque field of magnetic flux, and energized from an alternating current source; an armature having portions of its winding conductors arranged for torque-producing reaction with said torque field, and having other portions of its said conductors spacially removed, so that during the running of the motor these latter portions of the armature conductors do not traverse said torque field; and inductors comprising primaries energized from the said alternating current source in series with the torque field pole windings and spacially removed from said torque field, but arranged to extend substantially parallel with and in inductive proximity to the aforesaid other portions of the armature conductors, as they pass; all so that the independent fields of magnetic force around the inductor primaries induce currents in the armature windings for concurrent reaction with the main torque field to produce torque.

8. An alternating current motor comprising torque field means including a series of poles wound to interact in producing a torque field of magnetic flux, and energized from an alternating current source, but individually of such circumferential spread that the flux from each of them affects concurrently a multiplicity of the windings of the armature hereinafter mentioned; an armature having portions of its winding conductors arranged for torque-producing reaction with said torque field, and having other portions of its said conductors spacially removed, so that during the running of the motor these latter portions of the armature conductors do not traverse said torque field; and inductors comprising primaries also energized from the alternating current source and spacially removed from said torque field, but arranged to extend substantially parallel with and in inductive proximity to the aforesaid other portions of the armature conductors, as they pass, said inductors being of such limited circumferential spread that the independent field of magnetic flux around each inductor primary affects only a single armature winding conductor at a time; all so that the independent fields of magnetic force around the inductor primaries induce currents in the armature windings for concurrent reaction with the main torque field to produce torque.

9. An alternating current motor comprising torque field means including a series of poles wound to interact in producing a torque field of magnetic flux, and energized from an alternating current source, but individually of such circumferential spread that the flux from each of them affects concurrently a multiplicity of the windings of the armature hereinafter mentioned; an armature having portions of its winding conductors arranged for torque-producing reaction with said torque field, and having other portions of its said conductors spacially removed, so that during the running of the motor these latter portions of the armature conductors do not traverse said torque field; and inductors comprising primaries also energized from the alternating current source and spacially removed from said torque field, but arranged to extend substantially parallel with and in inductive proximity to the aforesaid other portions of the armature conductors, as they pass, and individually of very much less circumferential spread, so as to affect only single armature winding conductors as they pass; all so that the independent fields of magnetic force around the inductor primaries induce currents in the armature windings for concurrent reaction with the main torque field to produce torque.

10. An alternating current motor comprising torque field means including a series of poles wound to interact in producing a torque field of magnetic flux, and energized from an alternating current source; an armature having portions of its winding conductors arranged for torque-producing reaction with said torque field, and having other portions of its said conductors spacially removed, so that during the running of the motor these latter portions of the armature conductors do not traverse said torque field; and inductors comprising primaries also energized from the alternating current source and spacially removed from said torque field, but severally arranged to extend substantially parallel with and in inductive proximity to the aforesaid other portions of various armature windings that are concurrently in reactive relation to said torque field as they pass; all so that the independent fields of magnetic force around the inductor primaries induce currents in the armature windings for concurrent reaction with the main torque field to produce torque.

11. An alternating current motor comprising torque field means including a series of poles wound to interact in producing a torque field of magnetic flux, and energized from an alternating current source; an armature having portions of its winding conductors arranged for torque-producing reaction with said torque field, and having other portions of its said conductors spacially removed, so that during the running of the motor these latter portions of the armature conductors do not traverse said torque field; and inductors, corresponding to the several portions of the armature windings that are concurrently in reactive relation to said torque producing field, comprising primaries also energized from the alternating current source and spacially removed from said torque field, but severally arranged to extend substantially parallel with and in inductive proximity to the aforesaid other portions of the armature windings, as they pass; all so that the independent fields of magnetic force around the inductor primaries induce currents in the armature windings for concurrent reaction with the main torque field to produce torque.

WILLIAM E. BOSTWICK.